US011731200B2

(12) United States Patent (10) Patent No.: US 11,731,200 B2
Okazaki et al. (45) Date of Patent: Aug. 22, 2023

(54) COOLING DEVICE WITH PROCESSING HEAD OF A LAMINATION MOLDING APPARATUS

(71) Applicant: SODICK CO., LTD., Kanagawa (JP)

(72) Inventors: Shuji Okazaki, Kanagawa (JP); Naoto Nakamura, Kanagawa (JP); Shuichi Kawada, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 323 days.

(21) Appl. No.: 17/023,373

(22) Filed: Sep. 17, 2020

(65) Prior Publication Data

US 2021/0121953 A1 Apr. 29, 2021

(30) Foreign Application Priority Data

Oct. 23, 2019 (JP) ................................. 2019-192384

(51) Int. Cl.
 *B22F 10/28* (2021.01)
 *B22F 10/38* (2021.01)
 (Continued)

(52) U.S. Cl.
 CPC ............ *B22F 10/28* (2021.01); *B22F 3/1007* (2013.01); *B22F 3/1028* (2013.01); *B22F 10/00* (2021.01);
 (Continued)

(58) Field of Classification Search
 CPC ...... B22F 10/28; B29C 64/153; B29C 64/147
 See application file for complete search history.

(56) References Cited

U.S. PATENT DOCUMENTS 9,017,440 B2 * 4/2015 Yao ....................... B01D 45/12
 55/413
10,434,713 B1 * 10/2019 Sang ..................... B29C 64/393
(Continued)

FOREIGN PATENT DOCUMENTS

CN 102614749 8/2012
JP 2017193729 10/2017
(Continued)

OTHER PUBLICATIONS

"Office Action of Japan Counterpart Application", dated Dec. 15, 2020, with English translation thereof, pp. 1-8.

*Primary Examiner* — Xiao S Zhao
*Assistant Examiner* — Nicholas J Chidiac
(74) *Attorney, Agent, or Firm* — JCIPRNET

(57) ABSTRACT

The lamination molding apparatus includes an irradiator, a processing device, a cooling device, and an inert gas supply source. The irradiator irradiates a laser beam or an electron beam to a material layer to form a solidified layer. The processing device includes a processing head for holding a tool, and a processing head driver for moving the processing head in at least a horizontal direction. The cooling device is arranged in the processing head and cools a solidified body formed by laminating the solidified layers to a cooling temperature. The cooling device includes a cold gas discharger having a cold gas discharge port for discharging a cold gas being an inert gas having a temperature equal to or lower than the cooling temperature, and discharging the cold gas toward the solidified body. The inert gas supply source supplies the inert gas to the cold gas discharger.

9 Claims, 6 Drawing Sheets

(51) Int. Cl.
  *B22F 10/50*  (2021.01)
  *B22F 12/00*  (2021.01)
  *B22F 12/13*  (2021.01)
  *B22F 12/20*  (2021.01)
  *B22F 12/41*  (2021.01)
  *B22F 12/44*  (2021.01)
  *B22F 12/70*  (2021.01)
  *B22F 12/90*  (2021.01)
  *B22F 3/10*  (2006.01)
  *B23K 37/00*  (2006.01)
  *B33Y 30/00*  (2015.01)
  *B22F 10/00*  (2021.01)
  *B22F 10/32*  (2021.01)
  *B33Y 40/00*  (2020.01)
  *B22F 10/77*  (2021.01)

(52) U.S. Cl.
  CPC .............. *B22F 10/32* (2021.01); *B22F 10/38* (2021.01); *B22F 12/20* (2021.01); *B22F 12/224* (2021.01); *B22F 12/90* (2021.01); *B23K 37/003* (2013.01); *B33Y 40/00* (2014.12); *B22F 10/50* (2021.01); *B22F 10/77* (2021.01); *B22F 12/13* (2021.01); *B22F 12/41* (2021.01); *B22F 12/44* (2021.01); *B22F 12/70* (2021.01); *B33Y 30/00* (2014.12)

(56) References Cited

U.S. PATENT DOCUMENTS

| | | | |
|---|---|---|---|
| 11,117,333 B2* | 9/2021 | Tingle | B29C 70/545 |
| 11,331,850 B2* | 5/2022 | Motoyama | B29C 64/153 |
| 2007/0225642 A1* | 9/2007 | Houser | A61B 17/0644 |
| | | | 604/93.01 |
| 2007/0241482 A1 | 10/2007 | Giller et al. | |
| 2009/0047165 A1* | 2/2009 | Syvanen | B33Y 70/00 |
| | | | 420/60 |
| 2014/0020348 A1* | 1/2014 | Yao | B01D 45/08 |
| | | | 55/413 |
| 2017/0014906 A1 | 1/2017 | Ng et al. | |
| 2017/0080497 A1* | 3/2017 | Tuffile | B22F 3/26 |
| 2017/0173696 A1 | 6/2017 | Sheinman | |
| 2017/0297105 A1 | 10/2017 | Kawada et al. | |
| 2017/0334099 A1 | 11/2017 | Araie et al. | |
| 2019/0061001 A1 | 2/2019 | Araie et al. | |
| 2019/0263056 A1* | 8/2019 | Motoyama | B29C 67/00 |
| 2020/0215766 A1* | 7/2020 | Tingle | B29C 70/384 |
| 2020/0368815 A1* | 11/2020 | Baker | B29C 64/386 |
| 2021/0379667 A1* | 12/2021 | Kaya | B22F 10/20 |

FOREIGN PATENT DOCUMENTS

| | | |
|---|---|---|
| JP | 2017206744 | 11/2017 |
| JP | 6295001 | 3/2018 |
| JP | 2019011485 | 1/2019 |
| JP | 2019038139 | 3/2019 |
| JP | 6503375 | 4/2019 |

\* cited by examiner

COOLING DEVICE WITH PROCESSING HEAD OF A LAMINATION MOLDING APPARATUS

CROSS-REFERENCE TO RELATED APPLICATIONS

This application claims the priority benefit of Japanese Patent Application No. 2019-192384, filed on Oct. 23, 2019. The entirety of the above-mentioned patent application is hereby incorporated by reference herein and made a part of this specification.

BACKGROUND

Technical Field

The disclosure relates to a lamination molding apparatus.

Related Art

A plurality of methods are available in lamination molding of metal. For example, in powder bed fusion, a material layer made of material powder is formed on a molding table that is vertically movable in a chamber. Then, a predetermined portion of the material layer is irradiated with a laser beam or an electron beam, and the material powder at the irradiated position is melted or sintered to form a solidified layer. The formation of the material layer and the formation of the solidified layer are repeated to laminate solidified layers. In addition, the solidified layer may be cut during or after molding. Thus, a desired three-dimensional molded object is manufactured. Here, the solidified layer includes a molten layer and a sintered layer. In addition, the laminated solidified layers are referred to as a solidified body.

In the above lamination molding of metal, the temperature of the three-dimensional molded object after molding or the solidified layers during molding may be adjusted. For example, Japanese Patent No. 6295001 discloses a lamination molding method in which martensitic transformation is intentionally advanced every time one or more solidified layers are formed. The tensile stress caused by the contraction of the metal is reduced by the compressive stress caused by the martensitic transformation, and the deformation of the molded object caused by the residual stress is suppressed. In this molding method, in order to intentionally advance the martensitic transformation, a predetermined temperature adjustment is performed on the solidified layer (s) every time one or more solidified layers are formed.

Japanese Patent No. 6295001 discloses a method of adjusting the temperature of a solidified layer by using a temperature adjusting mechanism arranged in a molding table. In addition, the patent discloses a method of cooling the solidified layer by blowing a cold gas with a blower arranged in a chamber.

SUMMARY

One of the molding methods of adjusting the temperature of the solidified layer during molding is to suppress the deformation of the entire solidified body by using the stress accompanying the martensitic transformation. Hereinafter, this molding method is described as an example, and the disclosure is also applicable to a lamination molding apparatus for implementing another molding method. In this molding method, the entire solidified body is heated to a predetermined molding temperature, and the material layer is preheated during the formation of a predetermined number of solidified layers. In addition, when the material layer is melted or sintered to form a solidified layer, the solidified body including the newly formed solidified layer is heated to the predetermined molding temperature. Then, after the predetermined number of solidified layers are formed, the entire solidified body is cooled to a predetermined cooling temperature. After cooling, the entire solidified body is heated to the predetermined molding temperature again to preheat the material layer and heat the solidified layer formed subsequently. The above steps are repeated until the desired molded object is obtained.

Only the newly formed solidified layer, that is, only the portion located above the solidified body at the time of cooling needs to be cooled to generate the martensitic transformation. However, when the temperature of the solidified layer is adjusted by the temperature adjusting mechanism arranged in the molding table, the temperature of the entire solidified body needs to be adjusted. Thus, the greater the number of the solidified layers and the thicker the solidified body, the longer the time required for the temperature adjustment. In a lamination molding apparatus for implementing a molding method in which the temperature of the solidified layer is adjusted during molding, shortening of the molding time is required. In particular, when a relatively large molded object is manufactured, the shortening of the molding time is greatly required.

Here, for example, it is considered that the cooling time is shorten in a manner that the solidified layer is cooled from an upper surface of the solidified body having a relatively high temperature by using the blower arranged in the chamber, furthermore, the heating time is also shorten. However, the position where the cold gas is blown is constant, and thus the solidified layer may not be efficiently cooled accordingly to the position or the shape of the solidified body.

The disclosure has been made in view of such circumstances and aims to cool the solidified layer more efficiently.

According to the disclosure, a lamination molding apparatus is provided which includes: an irradiator for forming a solidified layer by irradiating a laser beam or an electron beam to a material layer formed for each of a plurality of divided layers obtained by dividing a desired three-dimensional molded object at a predetermined height; a processing device including a processing head for holding a tool used for the processing of the solidified layer, and a processing head driver for moving the processing head in at least a horizontal direction; and a cooling device arranged in the processing head and configured to cool at least a part of the solidified body formed by laminating the solidified layers to a predetermined cooling temperature. The cooling device includes a cold gas discharger having a cold gas discharge port for discharging a cold gas being an inert gas having a temperature equal to or lower than the cooling temperature, and discharging the cold gas toward the at least the part of the solidified body, and the lamination molding apparatus further includes an inert gas supply source for supplying the inert gas to the cold gas discharger.

In the lamination molding apparatus according to the disclosure, the cold gas discharger for discharging the cold gas toward the at least the part of the solidified body is arranged on the processing head configured to be movable in at least the horizontal direction. Accordingly, the cold gas discharger can be moved to a desired position to discharge the cold gas toward at least a part of the solidified body, and thereby cooling can be performed more efficiently depending on the position and shape of the solidified body.

DESCRIPTION OF THE EMBODIMENTS

Hereinafter, an embodiment of the disclosure is described with reference to the drawings. The various modification examples described below can be implemented in any combination.

Figure 1:
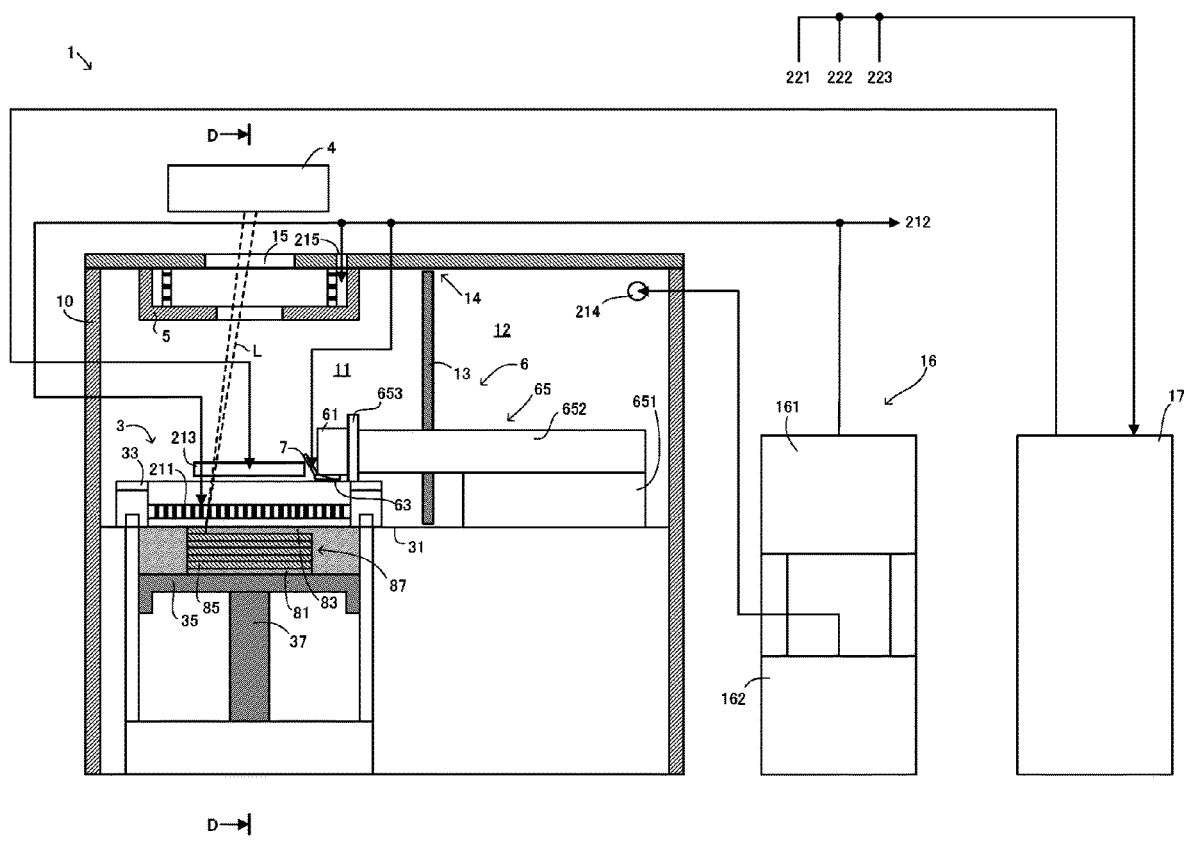
FIG. 1 is a schematic side view of a lamination molding apparatus according to an embodiment of the disclosure.
Figure 2:
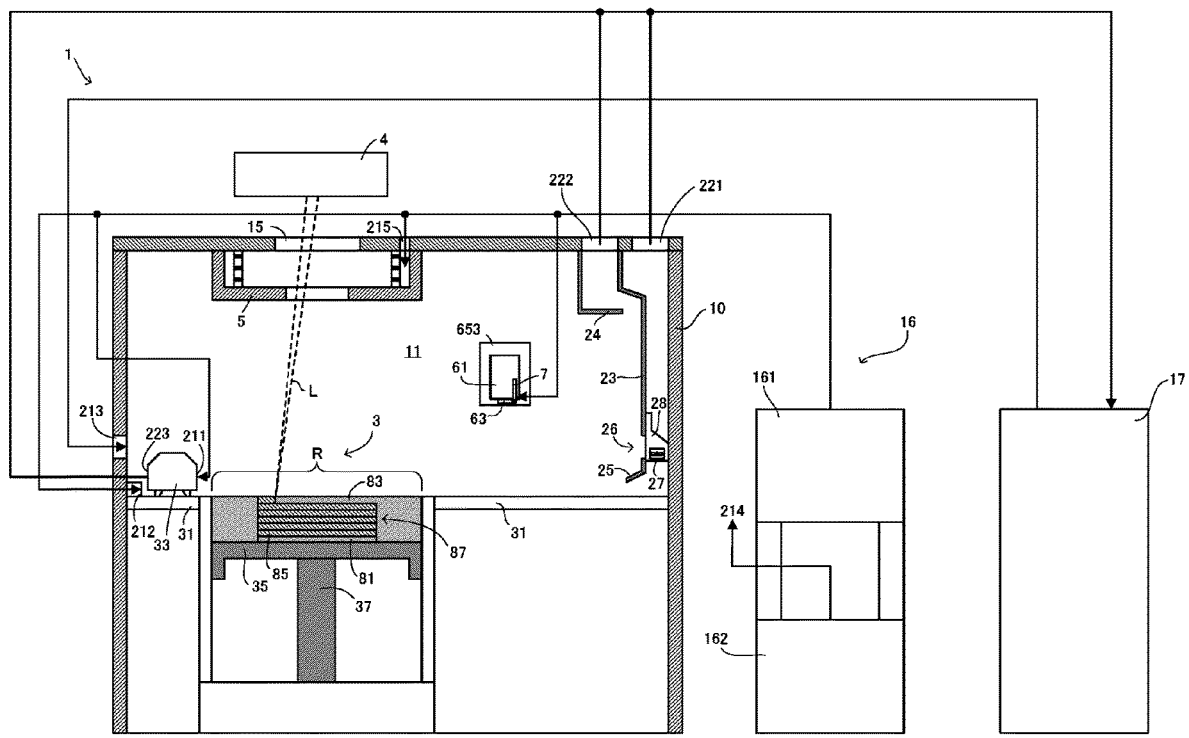
FIG. 2 is a sectional view taken along line D-D of FIG. 1.

The lamination molding apparatus 1 according to an embodiment of the disclosure repeats a step of forming a material layer 83 and a step of irradiating the material layer 83 with a laser beam L to melt or sinter the material layer 83 to form a solidified layer 85, for each of a plurality of divided layers obtained by dividing a desired three-dimensional molded object at a predetermined height. Then, the lamination molding apparatus 1 manufactures the three-dimensional molded object having the desired shape. Hereinafter, a plurality of the solidified layers 85 that are laminated and strongly bonded to each other are referred to as a solidified body 87. As shown in FIGS. 1 and 2, the lamination molding apparatus 1 of the disclosure includes a chamber 10, a material layer forming device 3, an irradiator 4, a processing device 6, and a cooling device 7.

The chamber 10 is configured to be substantially sealed. The chamber 10 is partitioned into a molding chamber 11 and a drive chamber 12 by a bellows 13. In the molding chamber 11, a three-dimensional molded object is formed. The drive chamber 12 houses most of a processing head driver 65 of the processing device 6. A communication section 14 being a small gap through which an inert gas can pass exists between the molding chamber 11 and the drive chamber 12.

The material layer forming device 3 is arranged in the molding chamber 11. The material layer forming device 3 includes a base 31 and a recoater head 33. The base 31 has a molding region R being a region in which the desired three-dimensional molded object is formed. The recoater head 33 is arranged on the base 31 and configured to be movable in a horizontal direction. Blades are arranged respectively on both side surfaces of the recoater head 33. The recoater head 33 is supplied with metal material powder from a material supply device (not shown), and reciprocates in the horizontal direction while discharging the material powder contained therein from a bottom surface. At this time, the blades flatten the discharged material powder to form the material layer 83. A molding table 35 which is movable in a vertical direction by a molding table driver 37 is arranged in the molding region R. When the lamination molding apparatus 1 is used, a base plate 81 is arranged on the molding table 35, and the first material layer 83 is formed on the base plate 81.

A temperature adjusting mechanism for adjusting the temperature of the molding table 35 is arranged inside the molding table 35. The temperature adjusting mechanism has a heater and a cooler arranged inside the molding table 35. The heater is, for example, an electric heater or a conduit through which a heat medium flows. The cooler is, for example, a conduit through which a refrigerant flows. Moreover, the cooler of the temperature adjusting mechanism may have any structure capable of performing a certain degree of cooling, and may cool to a temperature higher than a cooling temperature of the cooling device 7 described later. For example, the cooler can cool the molding table 35 to room temperature.

Figure 3:
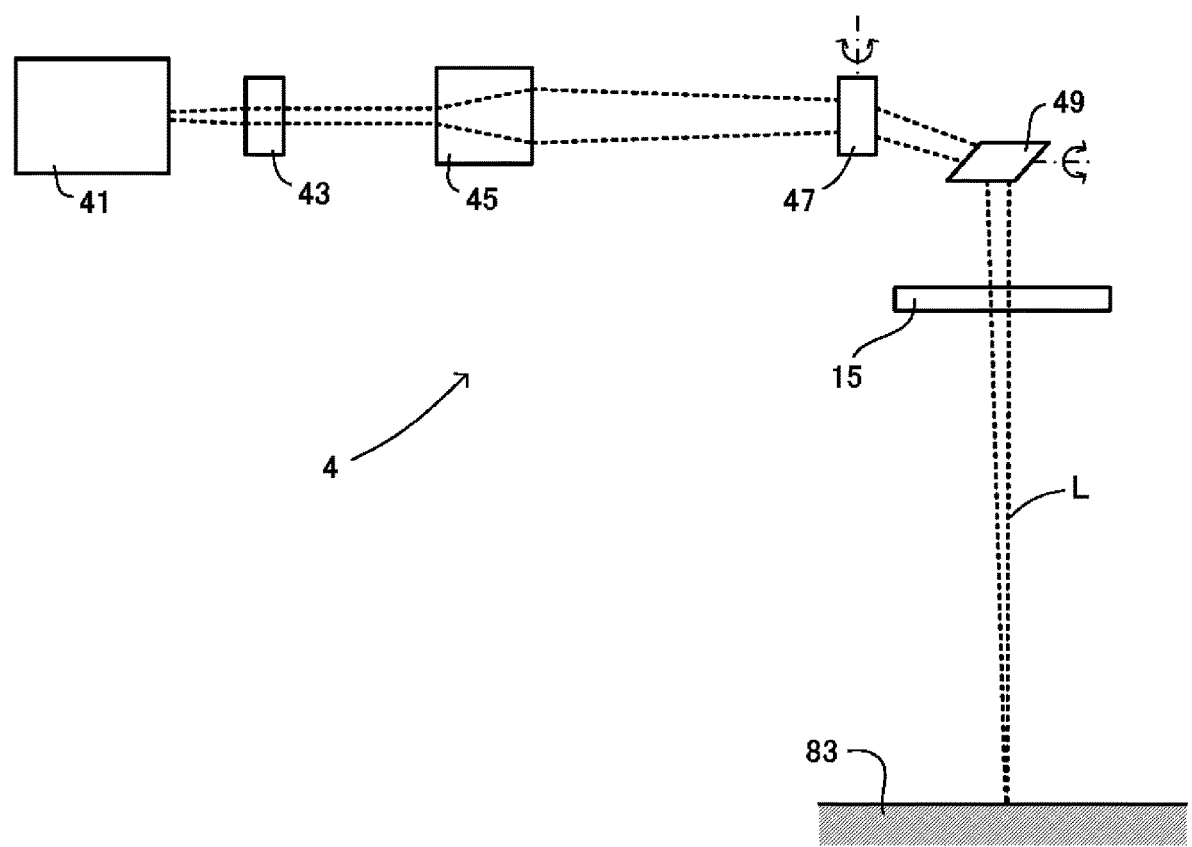
FIG. 3 is a schematic configuration view of an irradiator.

The irradiator 4 is arranged above the chamber 10. The irradiator 4 irradiates a predetermined irradiation region of the material layer 83 formed on the molding region R with the laser beam L to melt or sinter the material layer 83 at the irradiated position, thereby forming the solidified layer 85. The irradiation region is present in the molding region R, and approximately coincides with the region surrounded by the contour shape of the three-dimensional molded object in the predetermined divided layer. As shown in FIG. 3, the irradiator 4 includes a light source 41, a collimator 43, a focus control unit 45, and a galvano scanner.

The light source 41 generates the laser beam L. Here, the laser beam L is not limited in type as long as it can sinter or melt the material layer 83. For example, the laser beam L may be a fiber laser, a $CO_2$ laser, a YAG (yttrium aluminum garnet) laser, a green laser or a blue laser. The collimator 43 converts the laser beam L output from the light source 41 into parallel light. The focus control unit 45 has a condenser lens and a motor for moving the condenser lens back and forth, and adjusts the laser beam L output from the light source 41 to a desired spot diameter. The galvano scanner has a pair of galvano mirrors 47 and 49, and an actuator for rotating the galvano mirrors 47 and 49, respectively. The rotation angle of the galvano mirrors 47 and 49 is controlled depending on a magnitude of a rotation angle control signal input from a control device (not shown). The galvano mirrors 47 and 49 two-dimensionally scan the laser beam L output from the light source 41.

The laser beam L that has passed through the galvano mirrors 47 and 49 is transmitted through a window 15 arranged on an upper surface of the molding chamber 11 and irradiated to the material layer 83 formed in the molding region R. The window 15 is formed of a material that can transmit the laser beam L. For example, when the laser beam L is a fiber laser or a YAG laser, the window 15 can be made of quartz glass.

Figure 4:
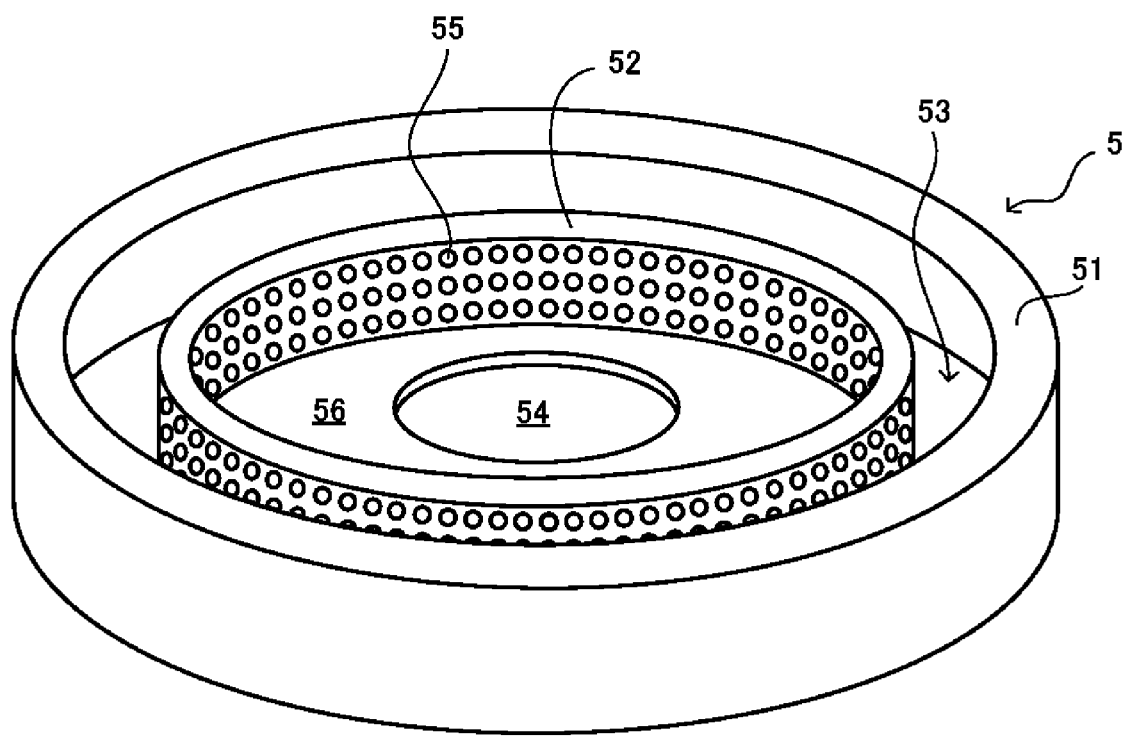
FIG. 4 is an enlarged view of a pollution prevention device.

A pollution prevention device 5 is arranged on the upper surface of the molding chamber 11 so as to cover the window 15. As shown in FIG. 4, the pollution prevention device 5 includes a cylindrical housing 51 and a cylindrical diffusion member 52 arranged in the housing 51. An inert gas supply space 53 is arranged between the housing 51 and the diffusion member 52. In addition, an opening portion 54 is arranged on a bottom surface of the housing 51 inside the diffusion member 52. The diffusion member 52 is provided with a large number of pores 55, and the clean inert gas supplied to the inert gas supply space 53 is filled in a clean chamber 56 through the pores 55. Then, the clean inert gas filled in the clean chamber 56 is ejected toward the lower side of the pollution prevention device 5 through the opening portion 54. Thus, fume adhesion to the window 15 is prevented.

Moreover, the irradiator may irradiate, for example, an electron beam to sinter or melt the material layer 83 to form the solidified layer 85. For example, the irradiator includes a cathode electrode, an anode electrode, a solenoid, and a collector electrode. The cathode electrode emits electrons. The anode electrode focuses and accelerates the electrons. The solenoid forms a magnetic field to terminate the direction of the electron beam in one direction. The collector electrode is electrically connected to the material layer 83 being an irradiation target. A voltage is applied between the collector electrode and the cathode electrode.

The processing device 6 includes a processing head 61 and a processing head driver 65 for driving the processing head 61. The processing head driver 65 has an optional actuator for moving the processing head 61 in at least a horizontal direction. For example, the processing head driver 65 includes a Y-axis driver 652 for moving the processing head 61 arranged in the molding chamber 11 in a Y-axis direction, an X-axis driver 651 which is arranged on the base 31 and configured to move the Y-axis driver 652 in an X-axis direction, and a Z-axis driver 653 for moving the processing head 61 in a Z-axis direction. For example, as a more specific configuration, the X-axis driver 651 includes an X-axis guide rail which is fixed to the base 31 and extends in the X-axis direction, an X-axis slider which slides along the X-axis guide rail, and an X-axis moving body which is fixed to the X-axis slider. The Y-axis driver 652 includes a Y-axis guide rail which is fixed to the X-axis moving body and extends in the Y-axis direction, a Y-axis slider which slides along the Y-axis guide rail, and a Y-axis moving body fixed to the Y-axis slider. The Z-axis driver 653 includes a Z-axis guide rail which is fixed to the Y-axis moving body and extends in the Z-axis direction, and a Z-axis slider which slides along the Z-axis guide rail and to which the processing head 61 is fixed. Moreover, a predetermined horizontal direction is the X-axis direction, a horizontal direction orthogonal to the X-axis direction is the Y-axis direction, and a predetermined vertical uniaxial direction is the Z-axis direction.

The processing head 61 includes a spindle 63. The spindle 63 is configured to be capable of gripping and rotating a tool such as an end mill (not shown). The tool rotated by the spindle 63 can cut a surface and unnecessary portions of the solidified layer 85. Cutting tools are preferably a plurality of types of cutting tools, and the cutting tool to be used can be changed during molding by an automatic tool changer (not shown). With the above configuration, the processing head 61 can cut the solidified layer 85 at any position in the molding chamber 11.

Moreover, instead of the above embodiment, the processing device may include a processing head provided with a swirling mechanism for holding a tool such as a tool bit and rotating the cutting tool along a rotation axis in the vertical direction, and a processing head driver for horizontally driving the processing head. The processing head driver has, for example, a pair of first horizontal moving mechanisms, a gantry arranged on the pair of first horizontal moving mechanisms, and a second horizontal moving mechanism which is attached to the gantry and to which the processing head is fixed. At this time, the processing head driver may not have a driver for moving the processing head in the Z-axis direction. That is, the processing head driver may be configured to move the processing head in at least the horizontal direction.

The chamber 10 is supplied with an inert gas of a predetermined concentration from an inert gas supply device 16, and discharges the inert gas containing fumes generated when the solidified layer 85 is formed during molding. The inert gas discharged from the chamber 10 is preferably returned to the chamber 10 after the fumes are removed by a fume collector 17. The chamber 10 is provided with one or more supply ports for the inert gas supplied from the inert gas supply device 16 and the inert gas returned from the fume collector 17, and one or more discharge ports for discharging the inert gas containing fumes from the chamber 10 to the fume collector 17. In the present embodiment, as shown in FIGS. 1 and 2, a first supply port 211, a second supply port 212, a third supply port 213, a fourth supply port 214 and a fifth supply port 215 are arranged as supply ports. In addition, a first discharge port 221, a second discharge port 222 and a third discharge port 223 are arranged as discharge ports. Besides, the inert gas supply device 16 includes a first inert gas supply device 161 and a second inert gas supply device 162. Each part is connected by a conduit such as a hose or a pipe.

The first supply port 211 is arranged on one side surface of the recoater head 33. The second supply port 212 is arranged in a pipe laid on an end surface of the base 31 on the side opposite to the side on which the first supply port 211 is arranged. The first supply port 211 and the second supply port 212 are connected to the first inert gas supply device 161, respectively, and alternatively supply an inert gas having a predetermined pressure and flow rate to the chamber 10 through the first supply port 211 or the second supply port 212 depending on the moving position of the recoater head 33. That is, when the first supply port 211 faces the irradiation region, the inert gas is supplied through the first supply port 211, and when the first supply port 211 does not face the irradiation region, the inert gas is supplied through the second supply port 212. The third supply port 213 is arranged on the side wall of the chamber 10 on the side on which the second supply port 212 is arranged, and is located at a height lower than the center of the molding chamber 11. The third supply port 213 is connected to the fume collector 17, and a clean inert gas from which fumes have been removed is returned to the chamber 10 through the third supply port 213. The fourth supply port 214 is arranged at the upper part of the drive chamber 12. The inert gas supplied from the second inert gas supply device 162 to the drive chamber 12 is supplied into the molding chamber 11 through the communication section 14. The fifth supply port 215 is arranged at the upper part of the pollution prevention device 5, and the inert gas is supplied from the first inert gas supply device 161 to the inert gas supply space 53 of the pollution prevention device 5.

A partition plate 23 is arranged so as to cover the side wall of the chamber 10 opposite to the side on which the second supply port 212 and the third supply port 213 are arranged. The first discharge port 221 is arranged at the upper end of the chamber 10 in a space defined by the partition plate 23 and the side wall, and the second discharge port 222 is arranged at the upper end of the irradiation region side of the chamber 10 near the partition plate 23. In addition, below the second discharge port 222, an upper guide plate 24 extending in an L-shape in cross section is arranged on the partition plate 23 side so as to surround the second discharge port 222. A lower guide plate 25 having a lower part extending to the irradiation region side is arranged at the lower end of the partition plate 23, and a predetermined gap 26 is formed between the partition plate 23 and the lower guide plate 25. The gap 26 is located at a height lower than the center of the molding chamber 11. A plurality of fans 27 for sucking the inert gas are arranged in a space defined by the partition plate 23 and the side wall near the gap 26, and a rectifier plate 28 extending upward is arranged at both ends of each fan 27. The inert gas sent to the vicinity of the partition plate 23 is sent to the first discharge port 221 from below the gap 26 or the lower guide plate 25 through the space defined by the partition plate 23 and the side wall. In addition, the inert gas that cannot be completely recovered from the gap 26 rises along the partition plate 23 and is guided to the upper guide plate 24 and sent to the second discharge port 222. The third discharge port 223 is arranged on the side surface of the recoater head 33 on which the first supply port 211 is not arranged. The inert gas is discharged from the chamber 10 through the first discharge port 221, the second discharge port 222 and the third discharge port 223 and sent to the fume collector 17.

The inert gas supply device 16 supplies an inert gas such as nitrogen to the chamber 10. The inert gas supply device 16 may be any device that can supply an inert gas having a predetermined concentration. The inert gas supply device 16 of the present embodiment includes a first inert gas supply device 161 and a second inert gas supply device 162. It is desirable that the first inert gas supply device 161 can supply an inert gas having a higher concentration than the second inert gas supply device 162. For example, the first inert gas supply device 161 is a PSA type nitrogen generator, and the second inert gas supply device 162 is a membrane separation type nitrogen generator. As described above, the first inert gas supply device 161 is connected to the first supply port 211, the second supply port 212 and the fifth supply port 215, and the second inert gas supply device 162 is connected to the fourth supply port 214. With this configuration, an inert gas having a higher concentration can be supplied to the molding chamber 11 in which the concentration of the inert gas directly affects the molding, and a required supply amount of the inert gas can be maintained. Moreover, the inert gas is a gas that does not substantially react with the material powder, and is appropriately selected from nitrogen gas, argon gas, helium gas and the like depending on the type of the material. The number of the inert gas supply device 16 may be one. The inert gas supply device 16 may be a gas cylinder in which an inert gas having a predetermined concentration is stored. It is desirable that the inert gas supplied from the inert gas supply device 16 be sufficiently dried.

The fume collector 17 is, for example, a dry electrostatic dust collector. The inert gas containing fumes discharged from the chamber 10 is sent to the fume collector 17, and the fumes are removed by electrostatic dust collection. The clean inert gas from which fumes are removed is sent to the third supply port 213 of the chamber 10. With this configuration, the inert gas can be reused. Moreover, the fume collector 17 may be other device, such as a filter type dust collector including a filter. Additionally, in order to circulate the inert gas inside the fume collector 17 efficiently, a fan motor may be arranged in the fume collector 17.

Figure 5:
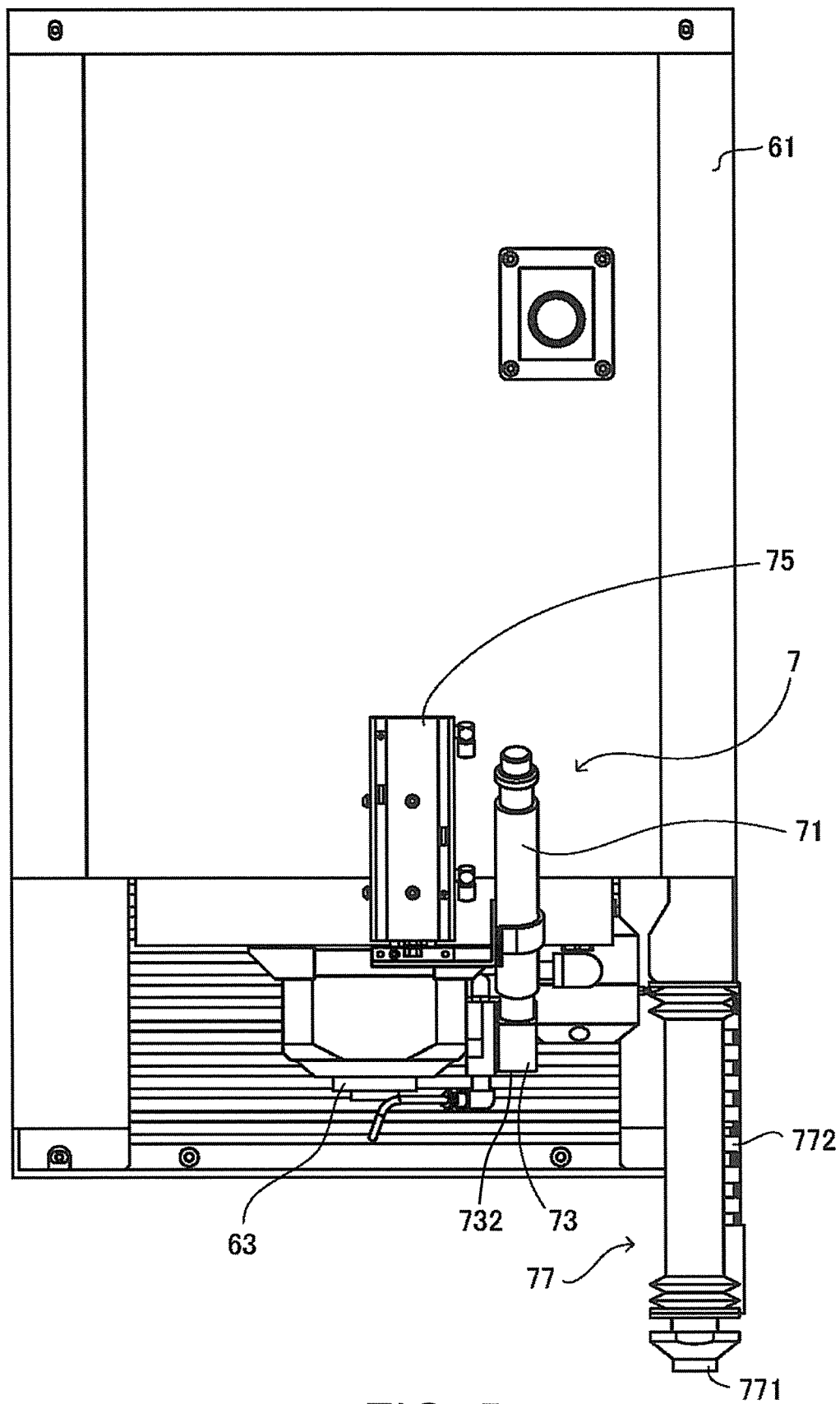
FIG. 5 is an enlarged view of a processing head and a cooling device viewed from the front.

The cooling device 7 cools at least a part of the solidified body 87 to the cooling temperature by discharging a cold gas being an inert gas having a temperature lower than or equal to a predetermined cooling temperature toward the at least the part of the solidified body 87. The cooling device 7 of the present embodiment includes a cold gas discharger 71, a duct 73, a first elevator 75, and a temperature measuring unit 77. The cold gas discharger 71 is supplied with an inert gas from an inert gas supply source. As shown in FIG. 5, the cooling device 7 is arranged in the processing head 61 and is configured to be movable to a desired position in the molding chamber 11 by the processing head driver 65. Thereby, according to the position and the shape of the solidified body 87, the cold gas discharger 71 can be moved to a desired position to discharge the cold gas.

Figure 6:
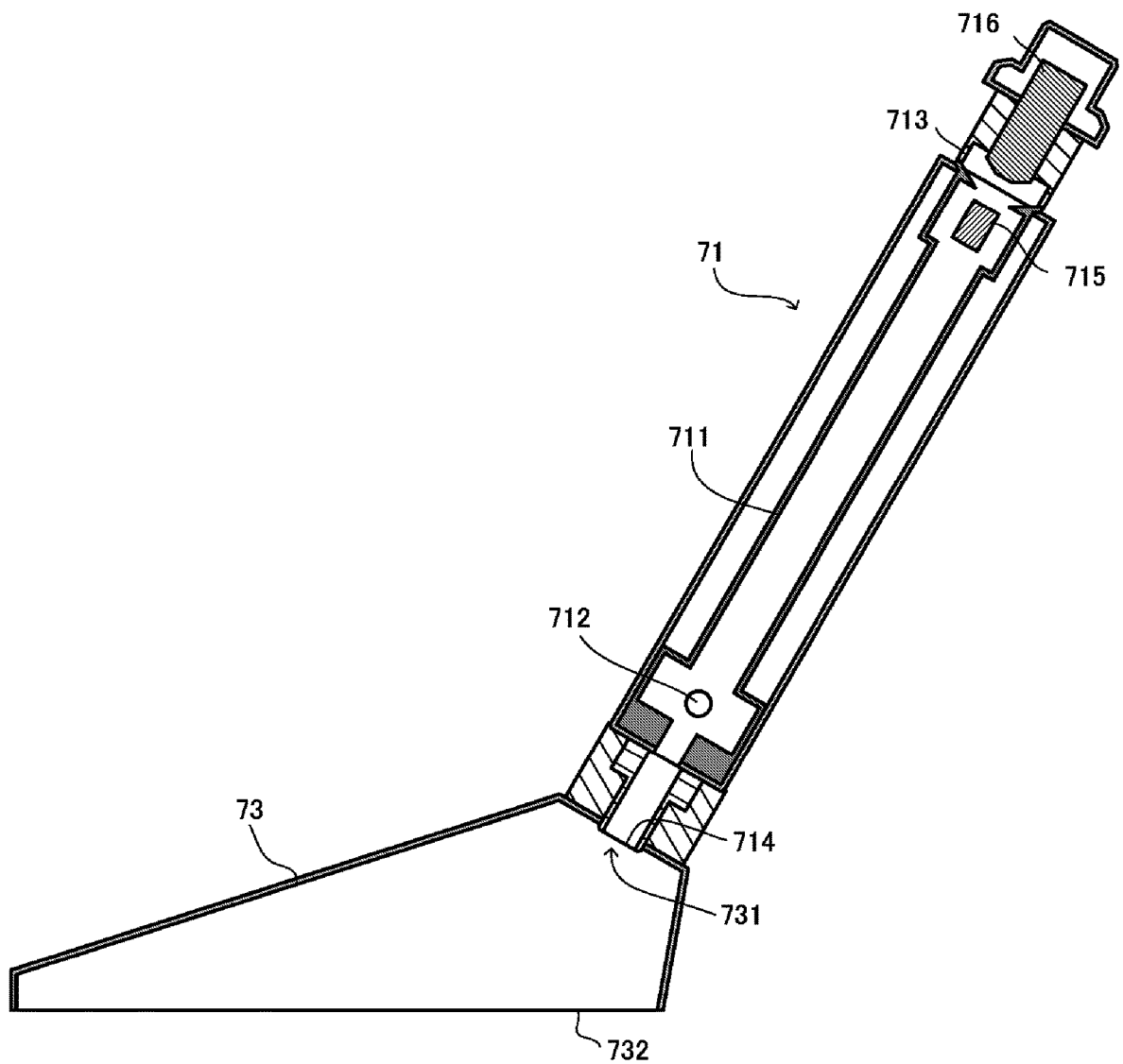
FIG. 6 is a cross-sectional view of a cold gas discharger and a duct.

The cold gas discharger 71 of the present embodiment has a vortex tube 711 for separating the inert gas flowing inside the cold gas discharger 71 into the cold gas and a hot gas being a heated inert gas. As shown in FIG. 6, the vortex tube 711 has an inert gas supply port 712, a hot gas discharge port 713, a cold gas discharge port 714, a rectifier plate 715, and an adjusting screw 716. The inert gas supply port 712, which is arranged between the hot gas discharge port 713 and the cold gas discharge port 714, is connected to the inert gas supply source and supplies the inert gas having a predetermined pressure into the vortex tube 711. The hot gas discharge port 713 and the cold gas discharge port 714 are arranged at one end and the other end of the vortex tube 711, respectively. An inner diameter of the vortex tube 711 on a hot gas discharge port 713 side is configured to be larger than an inner diameter of the vortex tube 711 on a cold gas discharge port 714 side. The inert gas supplied from the inert gas supply port 712 becomes a vortex flow by a vortex flow generator of the vortex tube 711, and flows toward the hot gas discharge port 713 side while swirling along an inner wall of the vortex tube 711. Hereinafter, this vortex flow is referred to as an outer vortex flow. At this time, the temperature of the inert gas becomes high on an inner wall side of the vortex tube 711 and becomes low at a central portion because of a centrifugal force of the outer vortex flow. A part of the inert gas that has passed through the rectifier plate 715 and stopped rotating is discharged from the hot gas discharge port 713 as the hot gas. The remaining inert gas becomes a vortex flow that is opposite to the outer vortex flow by the rectifier plate 715, and flows to the cold gas discharge port 714 side through the central portion of the vortex tube 711. Hereinafter, this vortex flow is referred to as an inner vortex flow. The inner vortex flow works on the outer vortex flow while expanding and decelerating, thus causing an increase in the temperature of the outer vortex flow and a decrease in the temperature of the inner vortex flow. Then, the inner vortex flow is discharged from the cold gas discharge port 714 as the cold gas. The temperature of the cold gas may be adjusted by adjusting the flow rate of the hot gas discharged from the hot gas discharge port 713 with the adjusting screw 716. According to the above configuration, the cold gas discharger 71 can be configured in a relatively small size without using a refrigerant. Additionally, the flow rate of the cold gas discharged from the vortex tube 711 is sufficiently suppressed, thus enabling the cold gas to be discharged without winding up the material powder too much. However, another device having a cooler for cooling an inert gas to generate a cold gas and a cold gas discharge port for discharging the cold gas may also be used as the cold gas discharger.

The inert gas supply source is any device that can supply an inert gas to the cold gas discharger 71. Specifically, in the present embodiment, the first inert gas supply device 161 is used as the inert gas supply source, and the first inert gas supply device 161 and the inert gas supply port 712 are connected by a conduit (not shown). An electromagnetic valve (not shown) is arranged in the conduit and is configured to switch the supply and stop of the inert gas. However, the second inert gas supply device 162 or the fume collector 17 may also be used as the inert gas supply source. In addition, an inert gas generator for generating a desired inert gas from air, a gas cylinder in which a desired inert gas is stored, or other device may be arranged as the inert gas supply source. In any case, it is desirable that the inert gas supplied from the inert gas supply source be sufficiently dried to prevent the cold gas from being condensed.

The duct 73 is arranged on the cold gas discharge port 714 side of the cold gas discharger 71. The duct 73 is a conduit through which cold gas flows, and has a first opening 731 connected to the cold gas discharge port 714, and a second opening 732 facing the at least the part of the solidified body 87. The cold gas discharged from the cold gas discharge port 714 is temporarily stored in the duct 73 and then discharged downward from the second opening 732. Thus, the cold gas is less likely to be scattered and the cooling efficiency is better when the cold gas is discharged to the solidified body 87 via the duct 73 than when the cold gas is discharged to the solidified body 87 directly from the cold gas discharge port 714. In particular, when the cold gas is generated by the vortex tube 711, the flow velocity of the cold gas is suppressed, so that the cold gas is stored in the duct 73 more efficiently. The second opening 732 is preferably configured parallel to a horizontal plane, that is, parallel to an upper surface of the solidified body 87. In addition, it is desirable that an area of the second opening 732 be larger than an area of the cold gas discharge port 714. On the other hand, the area of the second opening 732 is preferably smaller than an area of the molding region R. The second opening 732 may have any shape. In the present embodiment, the second opening 732 has a rectangular shape, the sides of which are a pair of lines extending in the X-axis direction and a pair of lines extending in the Y-axis direction. With the above duct 73, the range in which the cold gas is discharged can be adjusted according to a desired shape and area, and the solidified body 87 can be cooled more efficiently. Moreover, it is desirable that the duct 73 be thermally insulated in order to prevent the temperature of the cold gas from rising. In the present embodiment, a heat insulating material (not shown) is arranged on the outer surface of the duct 73.

The first elevator 75 is arranged on the processing head 61 and moves the cold gas discharger 71 in the vertical direction. In other words, the cold gas discharger 71 is attached to the processing head 61 via the first elevator 75. The first elevator 75 is, for example, an air cylinder; however, another actuator such as a hydraulic cylinder or an electric motor may also be used. Except during cooling by the cooling device 7, by moving the cold gas discharger 71 upward, the cold gas discharger 71 and the duct 73 can be prevented from interfering with the solidified body 87 and other devices when the solidified layer 85 is processed by the processing device 6 or at other times.

The temperature measuring unit 77 of the present embodiment includes a contact temperature sensor 771 for contacting the upper surface of the solidified body 87 and measuring the temperature, and a second elevator 772 for moving the temperature sensor 771 in the vertical direction. The temperature sensor 771 is, for example, a thermocouple; however, other temperature sensors such as a resistance temperature detector may also be used. The second elevator 772 is, for example, an air cylinder; however, other actuators such as a hydraulic cylinder and an electric motor may also be used. The temperature sensor 771 is retracted upward by the second elevator 772 except when the temperature is measured. Moreover, it is sufficient that the temperature measuring unit include a temperature sensor for measuring the temperature of the solidified body 87. For example, the temperature measuring unit may also be configured to include a non-contact temperature sensor such as an infrared temperature sensor. It can be confirmed whether the solidified body 87 has reached the desired cooling temperature by measuring the temperature of the solidified body 87.

The lamination molding apparatus 1 of the present embodiment is particularly effective in implementing the method for manufacturing a three-dimensional molded object in which the temperature of the solidified layer 85 is adjusted during molding. As an example of the above manufacturing method, in the present embodiment, a lamination molding method is implemented in which the molding of the solidified layer 85 is performed while heating and cooling it under a predetermined temperature condition, and thereby the martensitic transformation is intentionally advanced and the stress of the three-dimensional molded object is controlled. More specifically, each time one or more solidified layers 85 are newly molded, the temperature of the newly formed solidified layer 85 is adjusted in order of a predetermined molding temperature, a predetermined cooling temperature, and a predetermined molding temperature. Here, the molding temperature is equal to or higher than the martensitic transformation finish temperature of the solidified layer 85. The cooling temperature is lower than the molding temperature and is equal to or lower than the martensitic transformation start temperature of the solidified layer 85. In the range satisfying this temperature condition, the specific numerical values of the molding temperature and the cooling temperature may be changed during molding. Additionally, the one or more solidified layers 85 to be cooled are located above the solidified body 87, and the solidified layer(s) 85 to be cooled is hereinafter referred to as an upper surface layer. The upper surface layer includes the uppermost solidified layer 85 at the time of cooling.

First, the base plate 81 is placed on the molding table 35, and the height of the molding table 35 is adjusted to an appropriate position. In addition, the temperature of the molding table 35 is set to a predetermined molding temperature by the temperature adjusting mechanism arranged in the molding table 35.

In this state, the recoater head 33 moves on the molding region R and discharges the material powder to the molding region R. The material powder is leveled by the blades arranged on the recoater head 33, and the first material layer 83 is formed on the base plate 81. The material powder is a powder of a metallic material in which martensitic transformation occurs, for example, carbon steel or martensitic stainless steel. The molding table 35 of which the temperature is adjusted to the molding temperature preheats the material layer 83.

Next, the irradiator 4 irradiates the irradiation region of the first material layer 83 with the laser beam L. The material powder in the irradiation region is sintered or melted by the laser beam L, and thereby the first solidified layer 85 is formed. The molding table 35 of which the temperature is adjusted to the molding temperature heats the solidified layer 85 to the molding temperature.

When a plurality of solidified layers 85 are cooled, the material layer 83 and the solidified layer 85 are subsequently formed. The molding table 35 is lowered by the thickness of the material layer 83, the recoater head 33 is moved on the molding region R, and the second material layer 83 is formed on the first solidified layer 85. The irradiator 4 irradiates the second material layer 83 with the laser beam L, and the second solidified layer 85 is formed. The formation of the material layer 83 and the formation of the solidified layer 85 are repeated as described above, and a solidified body 87 is formed in which a plurality of the solidified layers 85 are laminated.

After a predetermined number of solidified layers 85 are formed, the upper surface layer is cooled by the cooling device 7. The upper surface layer of which the temperature is adjusted to the molding temperature is cooled to a predetermined cooling temperature. Moreover, during cooling, it is preferable that the heater of the temperature adjusting mechanism in the molding table 35 be stopped and the cooler lowers the temperature of the molding table 35. At this time, the molding table 35 only needs to be cooled to the extent that excessive heat transfer to the solidified body 87 can be suppressed, and does not need to be cooled to the predetermined cooling temperature. For example, the temperature of the molding table 35 is adjusted to room temperature.

First, the X-axis driver 651 and the Y-axis driver 652 of the processing head driver 65 move the cold gas discharger 71 and the duct 73 arranged in the processing head 61 to the above of the upper surface layer. Then, the first elevator 75 lowers the positions of the cold gas discharger 71 and the duct 73 so that the discharge position of the cold gas is close to the upper surface layer. When the processing head driver 65 has the Z-axis driver 653, the processing head 61 may be further lowered to a position where the cold gas discharger 71 and the duct 73 are closer to the upper surface layer.

Subsequently, the discharge of the cold gas from the cold gas discharger 71 is started. Specifically, the supply of the inert gas from the inert gas supply source, which is the first inert gas supply device 161 in the present embodiment, to the cold gas discharger 71 is started, and then the cold gas is discharged from the second opening 732 of the duct 73 toward the upper surface layer. The cold gas discharger 71 and the duct 73 may be cooled while being moved by at least one of the X-axis driver 651 and the Y-axis driver 652 depending on the size of the upper surface layer. The time required for cooling may be determined based on the data measured previously, or may be calculated each time from the type of the material, the volume and the shape of the entire solidified body 87 or the upper surface layer, the molding temperature, the cooling temperature, and the like. By such cooling, at least a part of the austenite phase of the upper surface layer is transformed into the martensite phase.

The temperature measuring unit 77 measures the temperature of the upper surface of the solidified body 87 after cooling. If the temperature does not reach the predetermined cooling temperature, the cooling device 7 may perform cooling again. In addition, it may be that cooling is performed by using the cooling device 7 while the temperature measuring unit 77 measures the temperature of the upper surface of the solidified body 87, and the cooling is continued until the temperature reaches the predetermined cooling temperature.

After the cooling of the upper surface layer is completed, the supply of the cold gas from the inert gas supply source to the cold gas discharger 71 is stopped, and the first elevator 75 moves the cold gas discharger 71 upward. In addition, the temperature adjusting mechanism arranged in the molding table 35 sets the temperature of the molding table 35 to the predetermined molding temperature again. At this time, the temperature measuring unit 77 may measure the temperature of the upper surface of the solidified body 87, and formation of the next material layer 83 and solidified layer 85 may be not started until the temperature of the solidified body 87 reaches the molding temperature again. Then, the processing head driver 65 retracts the processing head 61 to a position where the processing head 61 does not interfere with the recoater head 33 and the laser beam L.

Moreover, a processing step of processing the end surface of the solidified layer 85 by using the processing device 6 may be implemented every time a predetermined number of the solidified layers 85 are formed. Preferably, cutting is performed on the upper surface layer after cooling. Thus, the upper surface layer can be cut after the martensitic transformation has occurred and the dimensions are stabilized, and accordingly the upper surface layer can be cut with higher precision. More preferably, cutting is performed on the upper surface layer after cooling of which the temperature is adjusted to room temperature. Thus, the upper surface layer can be cut while suppressing the influence of expansion or contraction caused by temperature, and accordingly the cutting can be performed with much higher precision.

As described above, the formation of the material layer 83 and the solidified layer 85, the cooling of the solidified layer 85, and the cutting of the solidified layer 85 are repeated to form the desired three-dimensional molded object. According to the cooling device 7 of the present embodiment, compared with the case in which only the temperature adjusting mechanism arranged in the molding table 35 is used for cooling, the temperature of the upper surface layer can be cooled more quickly, and the molding time of the three-dimensional molded object can be shorten. In addition, in the lamination molding method for intentionally advancing martensitic transformation to control the stress of the three-dimensional molded object, it is unnecessary to cool the entire solidified body, and only the upper part of the solidified body, that is, the upper surface layer needs to be cooled. Thus, the cooling device 7 of this embodiment is particularly effective. Moreover, because the cooling device 7 is arranged in the processing head 61, it is unnecessary to dispose another driver for moving the cooling device 7 in the horizontal direction. The cooling device 7 can have a relatively simple and small structure, and cooling can be performed more efficiently depending on the position and the shape of the solidified body 87.

What is claimed is:

1. A lamination molding apparatus, comprising:
an irradiator for forming a solidified layer by irradiating a laser beam or an electron beam to a material layer formed for each of a plurality of divided layers obtained by dividing a desired three-dimensional molded object at a predetermined height;
a processing device comprising a processing head for holding a tool used for processing of the solidified layer, and a processing head driver for moving the processing head in at least a horizontal direction and a vertical direction; and
a cooling device arranged in the processing head and configured to cool at least a part of a solidified body formed by laminating the solidified layers to a predetermined cooling temperature,
wherein the cooling device comprises a cold gas discharger having a cold gas discharge port for discharging a cold gas being an inert gas having a temperature equal to or lower than the cooling temperature, and discharging the cold gas toward the at least the part of the solidified body, and a first elevator for moving the cold gas discharger in the vertical direction relatively to the processing head, and
wherein the cold gas discharger is attached to the processing head via the first elevator, and
the lamination molding apparatus further comprises an inert gas supply source for supplying the inert gas to the cold gas discharger,
wherein the cold gas discharger has a vortex tube arranged in the processing head for separating the inert gas flowing inside the cold gas discharger into the cold gas and a hot gas being the heated inert gas,
the vortex tube has an inert gas supply port, a hot gas discharge port, and the cold gas discharge port,
the inert gas supply port is arranged between the hot gas discharge port and the cold gas discharge port, and is connected to the inert gas supply source,
the hot gas discharge port is arranged at one end of a vortex tube to discharge the hot gas, and
the cold gas discharge port is arranged at the other end of the vortex tube to discharge the cold gas.

2. The lamination molding apparatus according to claim 1, wherein the cooling device further comprises a duct having a first opening connected to the cold gas discharge port and a second opening facing the at least the part of the solidified body.

3. The lamination molding apparatus according to claim 2, wherein the second opening is parallel to a horizontal plane.

4. The lamination molding apparatus according to claim 2, wherein an area of the second opening is larger than an area of the cold gas discharge port.

5. The lamination molding apparatus according to claim 4, wherein the area of the second opening is smaller than an area of a molding region being an area in which the three-dimensional molded object is formed.

6. The lamination molding apparatus according to claim 1, further comprising a temperature measuring unit arranged in the processing head and having a temperature sensor for measuring the temperature of the solidified body.

7. The lamination molding apparatus according to claim 6, wherein the temperature sensor is a contact temperature sensor for measuring the temperature by coming into contact with the solidified body, and
the temperature measuring unit further comprises a second elevator for moving the temperature sensor in the vertical direction.

8. The lamination molding apparatus according to claim 1, wherein the cooling temperature is equal to or lower than a martensitic transformation start temperature of the solidified layer.

9. The lamination molding apparatus according to claim 8, wherein the cooling temperature is equal to or lower than a martensitic transformation finish temperature of the solidified layer.

* * * * *